(12) United States Patent
Li

(10) Patent No.: US 10,149,458 B1
(45) Date of Patent: Dec. 11, 2018

(54) GAMING DEVICE FOR PETS

(71) Applicant: Qiaoyun Li, Hunan (CN)

(72) Inventor: Qiaoyun Li, Hunan (CN)

(*) Notice: Subject to any disclaimer, the term of this patent is extended or adjusted under 35 U.S.C. 154(b) by 0 days.

(21) Appl. No.: 16/053,827

(22) Filed: Aug. 3, 2018

(51) Int. Cl.
*A01K 15/02* (2006.01)
*A63H 30/04* (2006.01)

(52) U.S. Cl.
CPC ............ *A01K 15/025* (2013.01); *A63H 30/04* (2013.01)

(58) Field of Classification Search
CPC .... A01K 15/025; A01K 15/00; A01K 15/024; A01K 29/00
USPC ................ 119/707, 706, 708, 709; 446/136
See application file for complete search history.

(56) References Cited

U.S. PATENT DOCUMENTS

| | | | | |
|---|---|---|---|---|
| 5,540,187 A * | 7/1996 | Udelle | ................ | A01K 15/025 119/706 |
| 5,682,692 A * | 11/1997 | Huang | ................ | A63H 33/26 40/411 |
| 5,875,736 A * | 3/1999 | Udelle | ................ | A01K 15/025 119/706 |
| 5,881,679 A * | 3/1999 | Hann | ................ | A01K 15/025 119/707 |
| 6,591,785 B1 * | 7/2003 | Boshears | ............ | A01K 15/024 119/706 |
| 2011/0209670 A1 * | 9/2011 | McElwain | ........... | A01K 15/025 119/707 |
| 2012/0097114 A1 * | 4/2012 | Scott | ................ | A01K 15/025 119/707 |

\* cited by examiner

*Primary Examiner* — Yvonne R Abbott-Lewis

(57) ABSTRACT

The present invention discloses a gaming device for pets, which is exclusively used for pets to play games. The gaming device for pets comprises a base, an upper cover, a power supply assembly, a drive assembly, a hanging bracket, and a rotary disc. The base and the upper cover are connected in a snap-fit engagement form a hollow cavity, the power supply assembly and the drive assembly are fixedly provided on the base of the hollow cavity, and the periphery of the hanging bracket is fixedly connected to the rotary disc. The present invention allows, via a control chip, recreational products to be revealed and hidden in notches of the upper cover. In addition, because the rotary disc flies up to rotate in the air, the problem that the rotary disc is in dry friction with others during rotation is fundamentally solved, thereby extending the service life of the product.

5 Claims, 2 Drawing Sheets

GAMING DEVICE FOR PETS

BACKGROUND OF THE INVENTION

1. Field of the Invention

The present invention relates to the technical field of toys, and in particular to a device which is exclusively used for pets to play games.

2. Description of the Related Art

With the rapid growth of global socioeconomic level of such as China, the process of urbanization is constantly accelerating. Due to the growth in the living standard of citizens, there is diversified development in modes of leisure, consumption, and emotional sustenance in the life of people. In particular, for many people, keeping pets has become another new mode for urban recreational life. In company with people, pets can eliminate their owners' loneliness and bring joy to people, and are highly beloved as good playmates for people. Accordingly, a variety of gaming devices for pets appear in succession, in order to satisfy pets' fondness for chasing and playing with movable gadgets, make fun in pets' daily life, better train their response capabilities, and facilitate their involvement in physical exercises. The gaming devices for pets include, for example, a gaming device for throwing, a gaming device for pets to tear and pull, or a gaming device for moving cursors, such as a cat toy as described in U.S. Patent US2010/0236496A1. However, it has been found in use that, during the rotation driven by engagement, a bottom end face of a gear device of an inner ring 102 is completely supported on a support frame at a lower portion of a non-rotating enclosure 110. Due to the influence of multiple factors such as gravity during operation, dry friction is formed between the gear device of the inner ring 102 and the support frame, so that creaking noises occur in use, thereby affecting the service life of the device.

SUMMARY OF THE INVENTION

An objective of the present invention is to provide a gaming device for pets that is portable, flexible, and highly recreational, in order to overcome the drawbacks in the prior art described above.

The present invention comprises the following technical solution: a gaming device for pets, comprising: a base, an upper cover, a power supply assembly, a drive assembly, a hanging bracket, and a rotary disc; wherein the base and the upper cover are connected in a snap-fit engagement to form a hollow cavity, wherein the power supply assembly and the drive assembly are fixedly provided on the base of the hollow cavity; and the drive assembly consists of a lower gear case seat, a drive motor, and an upper gear case seat, the lower gear case seat is fixedly provided on the base, the drive motor is provided between the lower gear case seat and the upper gear case seat, and an output end of the drive motor is engaged with internal teeth of the rotary disc surrounding the periphery of the drive assembly; wherein a protrusion is provided on the top of the upper gear case seat, a shaft of the hanging bracket is rotatably fixed on the protrusion, and the periphery of the hanging bracket is fixedly connected to the rotary disc.

The hanging bracket is in the form of symmetrically distributed brackets, a through-hole is provided at the center of the shaft of the hanging bracket, wherein the through-hole is fixedly connected to the protrusion of the upper gear case seat via a bearing. An engaging portion is provided at a lower side of a top portion of each bracket, wherein the engaging portion is embedded within an engaging slot at the circumference of the rotary disc.

One or more extension portions are provided at the circumference of the rotary disc, the extension portions being adapted to fasten a variety of recreational products, such as a feather, an oscillating bar, a fuzzy ball, a rope, among others.

Several notches are provided at a circumferential edge of the upper cover, for various types of recreational products to be revealed and hidden.

A control panel is further provided on the top of the upper cover.

The present invention allows, via a control chip, recreational products to be revealed and hidden in notches of the upper cover 2, increasing pets' interest in playing with toys. In addition, because the rotary disc flies up to rotate in the air, the problem that the rotary disc is in dry friction with others during rotation is fundamentally solved, thereby extending the service life of the product.

DETAILED DESCRIPTION OF THE PREFERRED EMBODIMENTS

Figure 1:
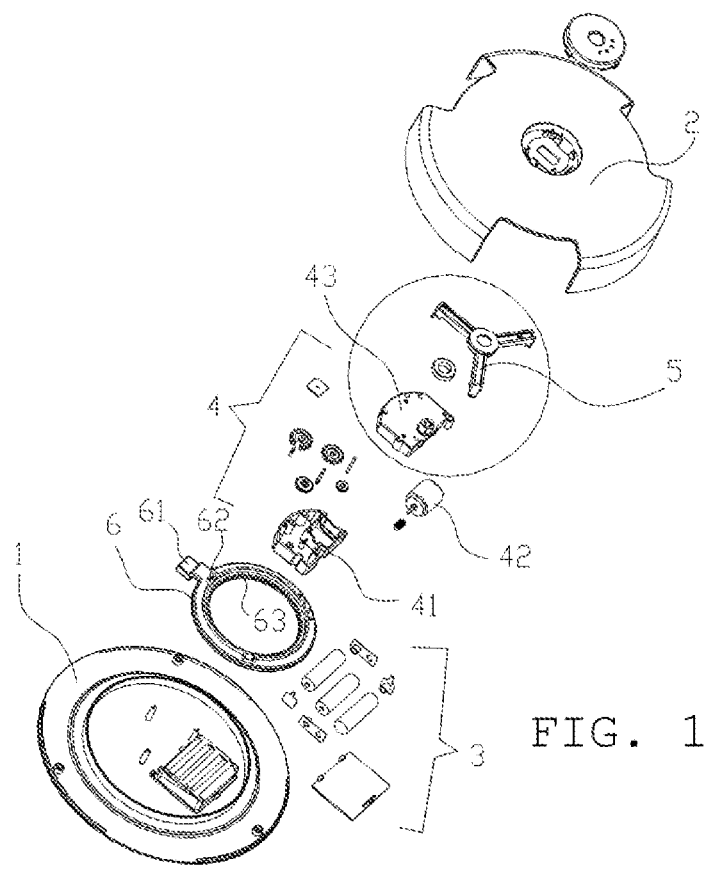
FIG. 1 is an exploded schematic diagram of a structure according to the present invention.
Figure 2:
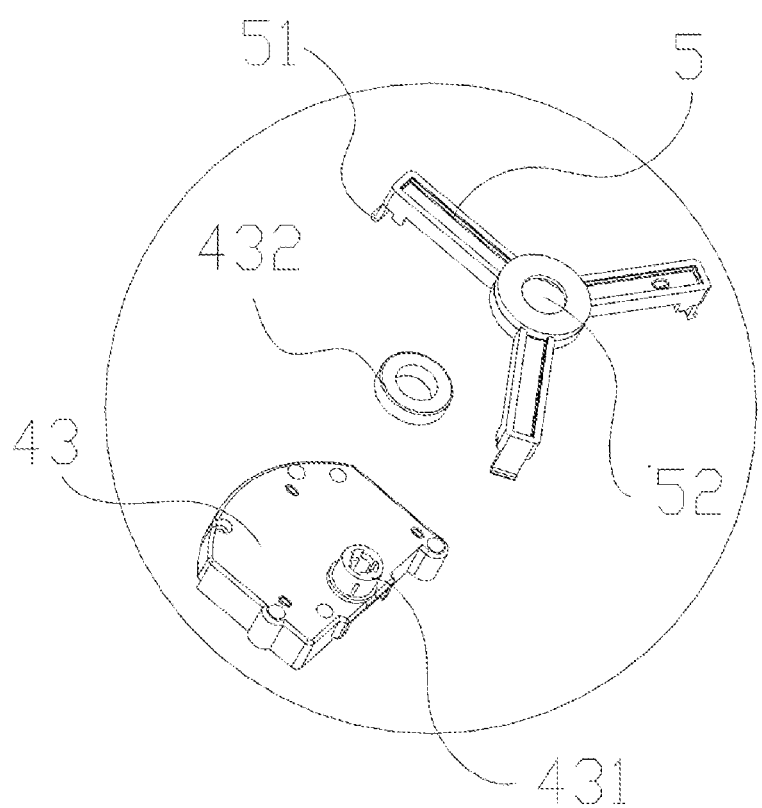
FIG. 2 is a partially enlarged view of FIG. 1.

With reference to and as illustrated in FIGS. 1 and 2, a gaming device for pets consists of a base 1, an upper cover 2, a power supply assembly 3, a drive assembly 4, a hanging bracket 5, and a rotary disc 6. The base 1 and the upper cover 2 are connected in a snap-fit engagement to form a hollow cavity. The power supply assembly 3 and the drive assembly 4 are fixedly provided on the base 1 of the hollow cavity. The drive assembly 4 consists of a lower gear case seat 41, a drive motor 42, and an upper gear case seat 43. The lower gear case seat 41 is fixedly provided on the base 1, and the drive motor 42 is provided between the lower gear case seat 41 and the upper gear case seat 43. An output end of the drive motor 42 is engaged with internal teeth 63 of the rotary disc 6 surrounding the periphery of the drive assembly 4. A protrusion 431 is provided on the top of the upper gear case seat 43. A shaft of the hanging bracket 5 is rotatably fixed on the protrusion 431. The periphery of the hanging bracket 5 is fixedly connected to the rotary disc 6.

The hanging bracket 5 is in the form of symmetrically distributed brackets. A through-hole 52 is provided at the center of the shaft of the hanging bracket 5. The through-hole 52 is fixedly connected to the protrusion 431 of the upper gear case seat 43 via a bearing. An engaging portion 51 is provided at a lower side of a top portion of each bracket, and the engaging portion 51 is embedded within an engaging slot 62 at the circumference of the rotary disc 6.

One or more extension portions 61 are provided at the circumference of the rotary disc 6, the extension portions 61 being adapted to fasten a variety of recreational products, such as a feather, an oscillating bar, a fuzzy ball, a rope, among others.

Several notches are provided at the circumferential edge of the upper cover 2, for various types of recreational products to be revealed and hidden.

A control panel is further provided on the top of the upper cover 2.

When the present invention is applied, it is convenient to control due to the fact that the control panel is provided on the top of the upper cover 2, and a power supply is provided due to the fact that the power supply assembly 3 is provided on the base 1. As such, in the process of rotation of the rotary disc 6 driven by the drive motor 42, because the engaging slot 62 at the circumference of the rotary disc 6 is engaged with the engaging portion 51 at the lower side of the top portion of each bracket, the rotary disc 6 is rotated around the protrusion 431 of the upper gear case seat 43, so as to enable the rotary disc 6 to fly up to rotate in the air.

What is claimed is:

1. A gaming device for pets, comprising: abase, an upper cover, a power supply assembly, a drive assembly, a hanging bracket, and a rotary disc; wherein
   the base and the upper cover are connected in a snap-fit engagement to forma hollow cavity, and the power supply assembly and the drive assembly are fixedly provided on the base of the hollow cavity;
   the drive assembly consists of a lower gear case seat, a drive motor, and an upper gear case seat, wherein the lower gear case seat is fixedly provided on the base, the drive motor is provided between the lower gear case seat and the upper gear case seat, and an output end of the drive motor is engaged with internal teeth of the rotary disc surrounding the periphery of the drive assembly, and
   the gaming device for pets is characterized in that, a protrusion is provided on the top of the upper gear case seat, a shaft of the hanging bracket is rotatably fixed on the protrusion, and the periphery of the hanging bracket is fixedly connected to the rotary disc.

2. The gaming device for pets according to claim 1, characterized in that the hanging bracket is in the form of symmetrically distributed brackets, a through-hole is provided at the center of the shaft of the hanging bracket, wherein the through-hole is fixedly connected to the protrusion of the upper gear case seat via a bearing; and
   an engaging portion is provided at a lower side of a top portion of each bracket, wherein the engaging portion is embedded within an engaging slot at the circumference of the rotary disc.

3. The gaming device for pets according to claim 1, characterized in that one or more extension portions are provided at the circumference of the rotary disc, the extension portions being adapted to fasten a variety of recreational products, such as a feather, a oscillating bar, a fuzzy ball, a rope, among others.

4. The gaming device for pets according to claim 1, characterized in that several notches are provided at the circumferential edge of the upper cover, for various types of recreational products to be revealed and hidden.

5. The gaming device for pets according to claim 1, characterized in that a control panel is further provided on the top of the upper cover.

* * * * *